March 23, 1948. J. E. COATES 2,438,205

MEASURING INSTRUMENT

Filed Sept. 15, 1945     2 Sheets-Sheet 1

INVENTOR.
J Edwin Coates

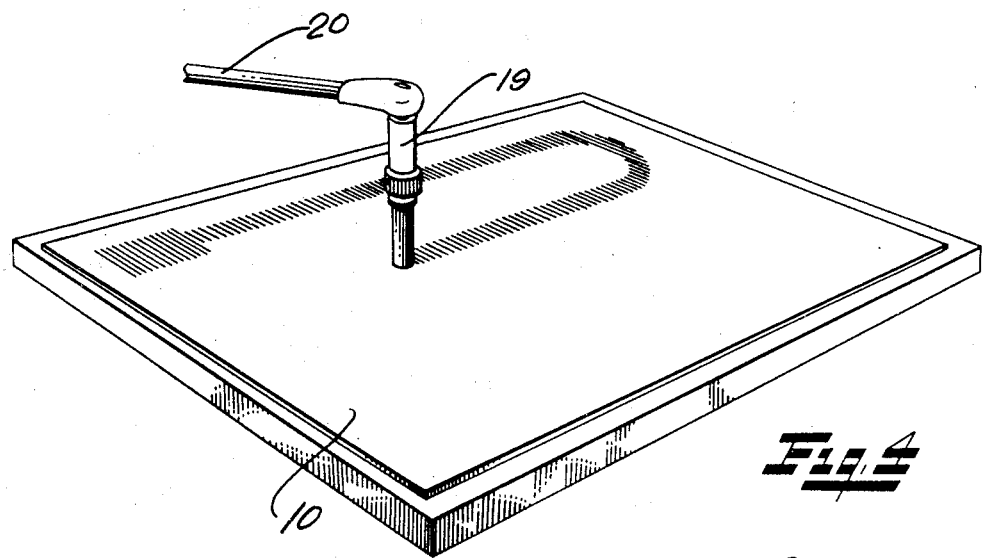
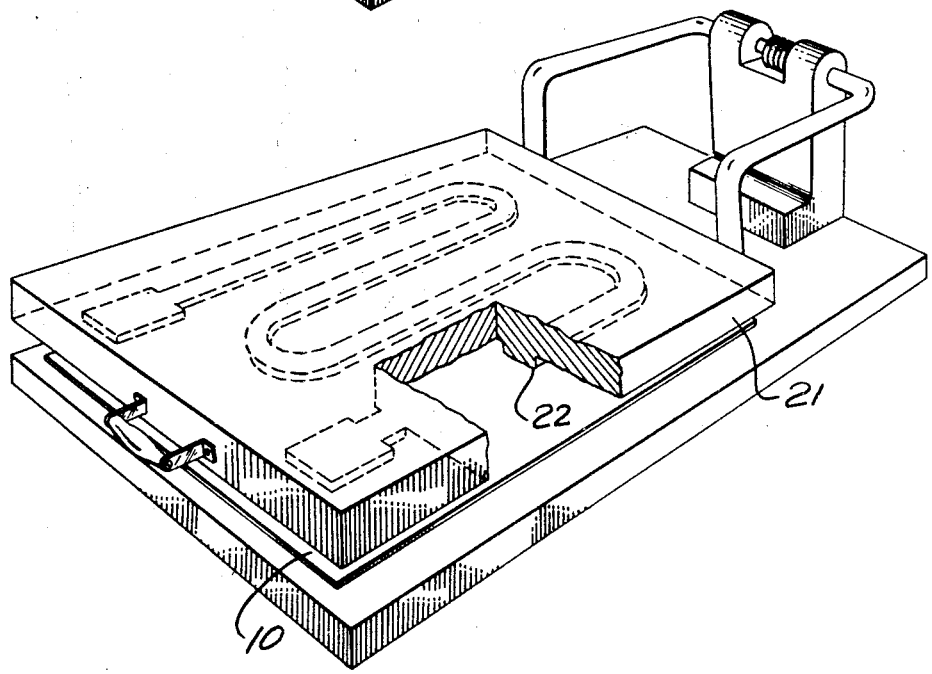

Patented Mar. 23, 1948

2,438,205

UNITED STATES PATENT OFFICE 2,438,205

MEASURING INSTRUMENT

J. Edwin Coates, Santa Monica, Calif., assignor to Douglas Aircraft Company, Inc., Santa Monica, Calif.

Application September 15, 1945, Serial No. 616,515

11 Claims. (Cl. 201—63)

This invention relates to measuring instruments and more particularly to a gauge for measuring the strain effects in elements or parts subjected to forces tending to produce strain therein.

The gauge of the present invention comprises in the broadest aspects thereof a body member to be mounted to a member subject to strain and carrying an elongate film-like mass of material forming a conductive path having a known resistance. The gauge is adapted to be connected to some electro-responsive means which will measure or evaluate the change in the resistance of the mass due to stresses imparted to the body member.

It has been heretofore proposed to mount to a body member a grid formed of fine resistance wire. The resistance wire was cemented to the body member by some suitable adhesive to the end that stresses exerted on the body member would be transmitted to the wire. These previously proposed instruments were difficult to fabricate for the fine resistance wire used to form the grid was exceedingly difficult to handle. This inherent defect complicated the fabrication of the instrument and also increased the manufacturing cost thereof.

The present invention obviates these difficulties for the grid of the gauge of the present invention is formed by depositing on the body or backing member a film of conducting material of any size and configuration desired. The film can be economically deposited on the body or backing member by any one of a number of methods now used to form or deposit films of various types.

One method of depositing the film upon the body or backing member comprises the steps of forming upon the member a grid of the desired shape by means of a stencil formed with an opening of the shape of the grid desired and depositing through the opening onto the underlying body or backing member a metallic or other electrically conductive coating which might comprise copper or bronze powder carried by a suitable vehicle. As the grid thus formed is current conducting and will have either a known or determinable resistance the resulting gauge could be used as are the previously proposed instruments formed with a grid of fine resistance wire.

It is now preferred, however, to deposit upon the area coated by the base material a metallic layer of some suitable conducting material. This layer may be deposited upon the coated area by an electroplating process although, obviously, other conventional coating processes could be used.

The base layer of the grid of the strain gauge of the present invention can also be formed by printing a grid of the desired shape upon the one face of the body or backing member by means of a conventional printing plate and a suitable metallic or current-conducting ink. It is also proposed to form the base layer of the grid by marking on the body or backing member with a stylus which when moved over the face of the body or backing member will mark the same with a current-conducting line of the desired configuration.

Although the grids formed by the printing operation and the stylus will carry a current and could be used in some applications to measure strain, it is here again preferred to deposit upon the base layers thus formed a second layer through a process such as electroplating or other process in which the thickness of the deposited film can be controlled.

As the strain gauge of the present invention can be produced in mass by means of conventional operations, the fabrication of the same is comparatively simple. Thus the manufacturing costs of the gauge of the present invention will be considerably less than those of previously proposed instruments which required the handling of fine delicate resistance wire in the assembly thereof.

The body or backing member may comprise any sheet-like material desired such as paper, glass, or plastic, as the selection of the material of the body or backing member will be governed by the part undergoing test, and the temperatures attained by the same during the test.

Other features and advantages of the present invention will be apparent from the following description taken in connection with the accompanying drawing in which:

Figure 4 is a view similar to Figure 3 but illustrating another method of forming the base layer of the grid of the instrument of the present invention; and Figure 5 is another view similar to Figure 3 showing the initial step in a still further modified method of forming the grid of the instrument of the present invention.

Figure 1:
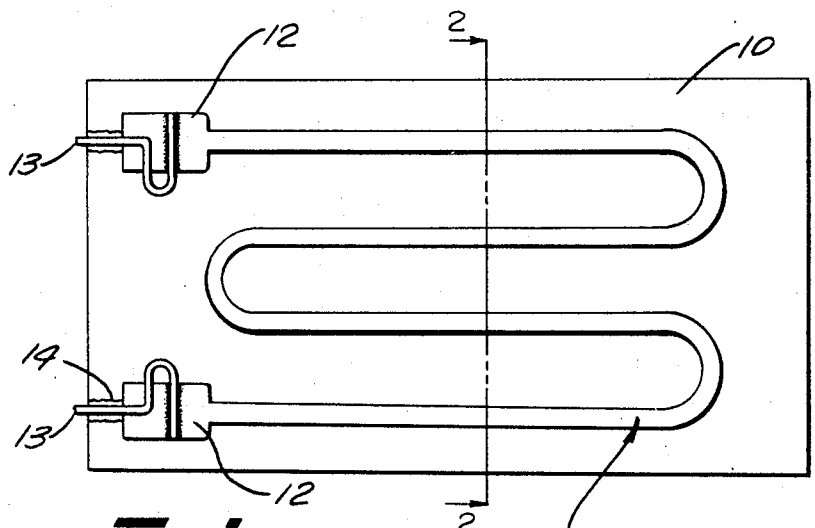
Figure 1 is a plan view of the instrument of the present invention.
Figure 2:
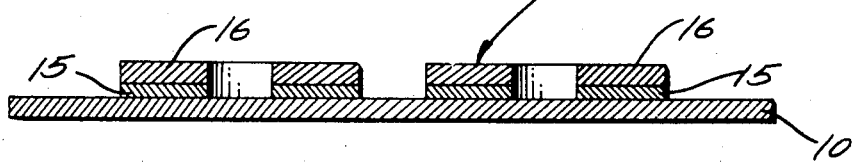
Figure 2 is a sectional view on an enlarged scale taken along line 2—2 of Figure 1 and exaggerated for the purpose of more clearly illustrating the invention.

The gauge or measuring instrument of the present invention, referring now to the drawing, and particularly Figure 1 thereof, comprises a body or backing member 10 carrying an elongate film-like mass 11 of conducting material. The film-like mass 11 is so formed on the face of the body or backing member 10 that it forms a continuous electrical path of either known or determinable resistance. In the form of the invention illustrated, the film-like mass is formed in the shape of a grid having areas 12 at the opposite ends of the conducting path formed by the same to which suitable leads 13 may be connected. In the form of the invention now preferred the ends of the leads 13 are soldered to the areas 12 while the remaining portion of the leads overlying the body member 10 are connected to the same by some suitable adhesive material 14.

The body or backing member 10 may be formed of any suitable material in sheet form. The material of the backing or body member 10 will be dictated to some extent by the particular use to which a gauge is to be put. Where the gauge is to be used to measure strain of bodies not heated in use the body member 10 could be formed of some suitable paper. Where the gauge is to be used to measure strain in parts which are heated in use to temperatures above the charring temperature of paper, the body member 10 could be formed of thin sheets of glass or some plastic material having a softening temperature in excess of the temperature which will be attained by the test part.

A glass cloth formed of tightly woven filaments of relatively small diameters can be used as the body member where the gauge is to be used to measure strain in parts normally heated in use to relatively high temperatures. In this use, the glass cloth can be attached to the part undergoing test by applying sufficient heat to the body member to cause the glass to soften and bond to the surface of the part.

In the illustrated embodiment of the present invention the film-like mass 11 is formed or made up from two layers 15 and 16 which may be formed of the same or different materials. The base layer 15 may be formed or deposited upon the body of the backing member 10 by any one of several different conventional methods.

Figure 3:
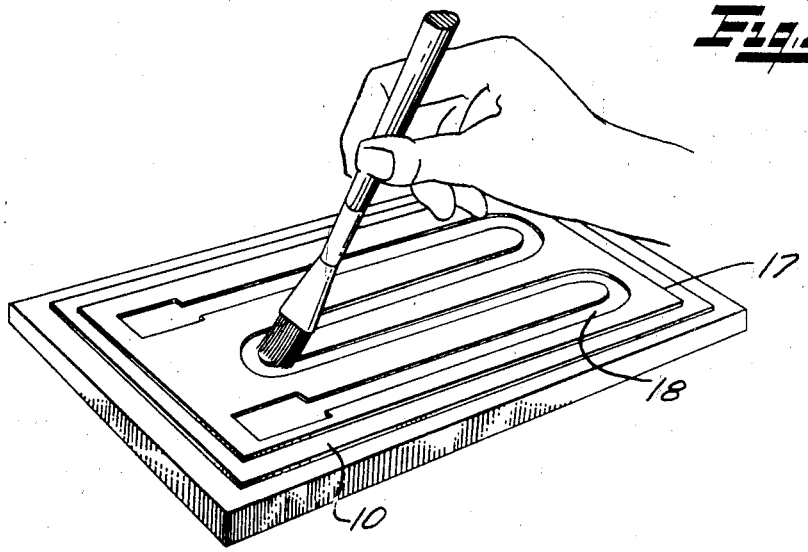
Figure 3 illustrates one step of one method of forming the gauge of the present invention.

This layer might be deposited upon the face of the body or backing member 10 by brushing or otherwise applying a suitable metallic or current-conducting material through an opening of the desired shape in a stencil 17. This method of applying the film forming the layer 15 is illustrated in Figure 3. The opening 18 formed in the stencil 17 is such that as the material when brushed or otherwise applied to the same it will form an area of the desired configuration such as the shape of the grid shown by Figure 1.

The material applied through the opening of the stencil must be current-conducting and may comprise some metallic powder such as copper or bronze carried by a suitable vehicle which when dried would form a relatively hard material carrying the metallic powder therein. The powder should be present in the vehicle in such quantities that a conducting path will be established after the vehicle has dried and hardened.

Although the grid formed by the base layer 15 is current conducting so that the gauge thus resulting could be used in some applications to measure strain, it is now preferred to form over the base layer 15 a second layer of some suitable conducting material. This layer may be deposited upon the area coated by an electro-plating process. This process is now preferred to form the layer 16 although other conventional processes such as are now used to lay down or deposit metallic films could be used.

To complete the gauge of the present invention after the base layer 15 has been deposited the body or backing member 10 can be placed in a suitable electro-plating bath in which the layer 15 would form the cathode. The body or backing member 10 would be allowed to remain in the bath for a time sufficient to build up a layer of the desired thickness. The instrument is then removed from the bath and after the same has dried the leads 13 are soldered to the areas 12 and adhesively engaged throughout their length overlying the body member to the same.

The base layer 15 can be formed by the method illustrated in Figure 4 wherein the grid 11 is formed on the body by means of a stylus 19 movable over the backing or body member by means of control mechanism 20. The material of the stylus 19 should be such as to mark the face of the body member with a layer sufficiently current-conducting to permit the coated layer to be connected into the electro-plating circuit as the cathode so that the layer 16 can be deposited thereon. As in the earlier described forms of the invention, leads 13 are electrically connected to the areas 12 after the layer 16 has been deposited.

There is shown in Figure 5 another method by which the base coat 15 may be applied or deposited to the one face of the body member 10. In this method of forming the base layer 15 a printing plate 21 is formed with a raised portion 22 having a configuration such as that of the grid shown at 11 in Figure 1. The plate can be used in any conventional printing press for printing with some suitable metallic or other current-conducting ink a grid of the desired shape. It will be understood that the ink used must contain sufficient current-conducting particles so that the resulting grid will be current-conducting to the end that the layer 16 can be deposited through a coating process such as electro-plating. In some cases the bond between the current-conducting particles of the printed grid is not sufficient to withstand the tensile stresses set up in the grid in use. The deposition of the layer 16 strengthens the bond and renders the mass homogeneous.

After the layer 16 has been deposited upon the printed layer 15 the leads 13 can be connected to the areas 12 as in the earlier described form of the invention.

The various methods by which the gauge may be formed can be carried out by relatively unskilled personnel. It will be seen that the present invention provides methods for producing strain gauges in large quantities at relatively low manufacturing costs.

Although the now preferred embodiments of the present invention have been illustrated and described herein it is to be understood that the invention need not be limited thereto for it is susceptible to changes in form and detail within the scope of the appended claims.

I claim:

1. A strain gauge comprising: a body member adapted to be bonded to a member subject to strain; a grid carried by one face of said body member, said grid comprising a film of current-conducting material bonded to said body member throughout its length so that strains induced in said body member will be transmitted to said film; and a layer of current-conducting material carried by said film.

2. The method of forming a strain gauge which comprises: the steps of depositing upon preselected portions of one face of a body member a band of current-conducting material; forming upon said band a second layer of current-conducting material; and thereafter attaching leads to the opposite ends of said band.

3. The method of forming a strain gauge which comprises: the steps of depositing upon preselected portions of the one face of a body member formed of non-conducting material a band of current-conducting material; forming upon said band a layer of current-conducting material the thickness of which is greater than the thickness of the material of said band; and thereafter attaching leads to said current-conducting material.

4. The method of forming a strain gauge which comprises: the steps of depositing upon the one face of a body member of non-conducting material an elongate film of current-conducting material; placing said body member in an electro-plating bath as a cathode; and continuing the plating current until a film of the desired thickness is deposited upon said first-named film.

5. The method of forming a strain gauge which comprises: the steps of placing a stencil having an opening formed therein over a body member; applying through the opening of the stencil onto the one face of the body member a current-conducting material carried by a vehicle which will form a flexible film when dry; removing said stencil and allowing said vehicle to harden and dry; thereafter depositing upon the area coated a layer of conducting material; and attaching leads to said layer.

6. The method of forming strain gauges which comprises: the steps of printing with a current-conducting ink an area on the one face of a body member formed of insulating material; connecting the area printed as a cathode in an electro-plating solution; causing the current to flow through said bath until film of the desired thickness has been deposited upon the area printed; and thereafter electrically connecting leads to the film deposited.

7. The method of forming a measuring instrument of the type described comprising: the steps of marking a continuous band on a body member of insulating material with a marking member formed of current-conducting material; depositing upon the band a layer of current-conducting material of a thickness greater than the thickness of the material of the band to form a grid on the body member, the resistance of which will vary with changes in strain transmitted thereto; and electrically connecting leads to the opposite ends of the layer deposited on said band.

8. A strain gauge comprising: a body member of insulating material adapted to have one surface thereof bonded to a member subject to strain; a grid carried by the other surface of said body member, said grid comprising a film of non-metallic current-conducting material bonded to said surface throughout its length so that the strains induced in said body member will be transmitted to said film; and a layer of metallic current-conducting material carried by and bonded to said film so that strains induced in said film will be transmitted to said metallic material the electrical resistance of which varies with changes of strain therein.

9. The method of forming a measuring instrument of the type described comprising: the steps of marking a continuous band on a body member of insulating material with a marking member formed of current-conducting material; forming a layer of current-conducting material upon said band by plating thereon a metallic material the resistance of which will vary in accordance with the changes in strain to which said body member is subjected; and thereafter electrically connecting leads to the opposite ends of said plated band.

10. The method of forming a measuring instrument of the type described comprising: forming a stencil having an opening therethrough of the desired configuration; placing said stencil over the one surface of a flat body member of insulating material; depositing through the opening of said stencil a current-conducting material to form on said surface a grid of the configuration of said opening comprising a continuous electrical path, the resistance of which will vary in accordance with changes in strain to which said body member is subjected; forming a layer of current-conducting material on said grid by plating on the material forming the same a metallic current-conducting material the electrical resistance of which will vary in accordance with changes of strain to which said body member is subjected; and electrically connecting leads to the opposite ends of the grid formed.

11. The method of forming a measuring instrument of the type described which comprises: the steps of printing with an ink containing current-conducting particles a continuous elongate area on the one face of a body member formed of insulating material; depositing upon the area printed a layer of current-conducting material the electrical resistance of which will vary in accordance with changes in strain to which said body member is subjected; and thereafter electrically connecting leads to the opposite ends of the current-conducting area printed on said body member.

J. EDWIN COATES.

REFERENCES CITED

The following references are of record in the file of this patent:

UNITED STATES PATENTS

| Number | Name | Date |
| --- | --- | --- |
| 1,702,062 | Sonkin | Feb. 12, 1929 |
| 1,832,419 | Pender | Nov. 17, 1931 |
| 2,252,464 | Kearnes et al. | Aug. 12, 1941 |
| 2,359,245 | Ritzmann | Sept. 26, 1944 |
| 2,373,676 | Germeshausen I | Apr. 17, 1945 |
| 2,380,514 | Germeshausen II | July 31, 1945 |